United States Patent
Kim et al.

(10) Patent No.: US 11,269,652 B2
(45) Date of Patent: Mar. 8, 2022

(54) OPPORTUNISTIC VEHICLE CONTROLLER RESTART SCHEDULING

(71) Applicant: FORD GLOBAL TECHNOLOGIES, LLC, Dearborn, MI (US)

(72) Inventors: Jin Kim, Ottawa (CA); Jeffrey William Wirtanen, Kanata (CA)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 16/421,794

(22) Filed: May 24, 2019

(65) Prior Publication Data

US 2020/0371814 A1    Nov. 26, 2020

(51) Int. Cl.
*G06F 9/4401* (2018.01)
*B60R 16/023* (2006.01)

(52) U.S. Cl.
CPC .......... *G06F 9/4401* (2013.01); *B60R 16/023* (2013.01)

(58) Field of Classification Search
None
See application file for complete search history.

(56) References Cited

U.S. PATENT DOCUMENTS

| 5,890,080 | A | 3/1999 | Coverdill et al. |
| 7,076,255 | B2 * | 7/2006 | Parupudi ............. H04W 12/104 |
| | | | 455/456.1 |
| 9,838,249 | B2 | 12/2017 | Kludy et al. |
| 2015/0039877 | A1 * | 2/2015 | Hall ........................ G06F 1/32 |
| | | | 713/2 |

* cited by examiner

*Primary Examiner* — Paul Yen
(74) *Attorney, Agent, or Firm* — Michael J. Spenner; Brooks Kushman P.C.

(57) ABSTRACT

A memory is configured to store statistics indicative of historical vehicle use patterns. A processor is programmed to identify a next reboot time and top locations at which reboot is allowed according to the statistics, and upon transition to a keyoff state, reboot a vehicle controller responsive to confirmation that a current time has reached at least the next reboot time and that the vehicle is located at one of the top locations.

14 Claims, 2 Drawing Sheets

OPPORTUNISTIC VEHICLE CONTROLLER RESTART SCHEDULING

TECHNICAL FIELD

Aspects of the disclosure generally relate to opportunistic scheduling of vehicle controller restart to reduce end-user impact.

BACKGROUND

Modern vehicles may be equipped with multiple high-function electronic control units (ECUs). Beyond just the user visible in-vehicle infotainment (IVI) systems, there are other non-user facing "headless" ECUs that are as complex, if not more complex, than a traditional IVI ECU. These modern units typically operate sophisticated operation systems such as Linux, QNX, or other commercial embedded systems.

High-function ECUs require a full power cycle to refresh new configurations or to apply software updates or firmware obtained from external sources (such as over-the-air updates received from a cloud server, or data read from an optical disk or USB drive). In the event of a functional defect, a reboot may be required to resolve or alleviate such a circumstance. However, a full system reboot of a high-function ECU may take a significant amount of time (on the order of 15-60 seconds, similar to the reboot process for a desktop PC) as opposed to smaller micro controllers that can boot in milliseconds or a few seconds.

SUMMARY

In one or more illustrative examples, a vehicle includes a memory configured to store statistics indicative of historical vehicle use patterns. The vehicle also includes a processor programmed to identify a next reboot time and top locations at which reboot is allowed according to the statistics, and upon transition to a keyoff state, reboot a vehicle controller responsive to confirmation that a current time has reached at least the next reboot time and that the vehicle is located at one of the top locations.

In one or more illustrative examples, a method for rebooting controllers of a vehicle includes, responsive to vehicle keyoff, identifying whether a scheduled reboot deadline has been reached and whether the vehicle is located at a reboot location; responsive to both the reboot deadline being reached and the vehicle being located at a reboot location, or responsive to no reboot of the controllers having been performed for at least a maximum reboot time interval, rebooting the controllers; and otherwise, deferring rebooting of the controllers.

In one or more illustrative examples, a non-transitory computer-readable medium includes instructions that, when executed by a processor of a vehicle, cause the vehicle to accumulate statistics from the vehicle, indicative of time intervals of days of the week when the vehicle is parked and top locations where the vehicle is most often parked; set a scheduled reboot deadline for a subset of vehicle controllers as a future day of the week and time based on the time intervals when the vehicle is parked; identify a set of top locations where the vehicle is most often parked; responsive to vehicle keyoff, identify whether a scheduled reboot deadline has been reached and whether the vehicle is located at one of the top locations; responsive to both the reboot deadline being reached and the vehicle being located at a reboot location, or responsive to no reboot of the controllers having been performed for at least a maximum reboot time interval, reboot the controllers; and otherwise, defer reboot of the subset of vehicle controllers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The time during which an ECU is inoperative for a reboot may result in a poor user experience. In an example, a user may be streaming media using a vehicle WiFi hotspot. However, the vehicle telematics control unit (TCU) serving the data for the WiFi hotspot may have entered into error state in another function of the TCU, causing a need for a reboot. Typically, the TCU may either reboot immediately or wait for next vehicle ignition OFF event to reboot the TCU. Yet, these choices may result in an inopportune time to reset the ECU and may impact user experience. Rebooting right away has an obvious customer-facing impact, while blindly resetting the ECU on ignition change may also cause impact to user if the vehicle is turned on again in a short period of time. To make the user experience more seamless for the end user, additional information about the vehicle's state may be used to better determine a time to reboot the ECU having the least adverse user affect.

Figure 1:
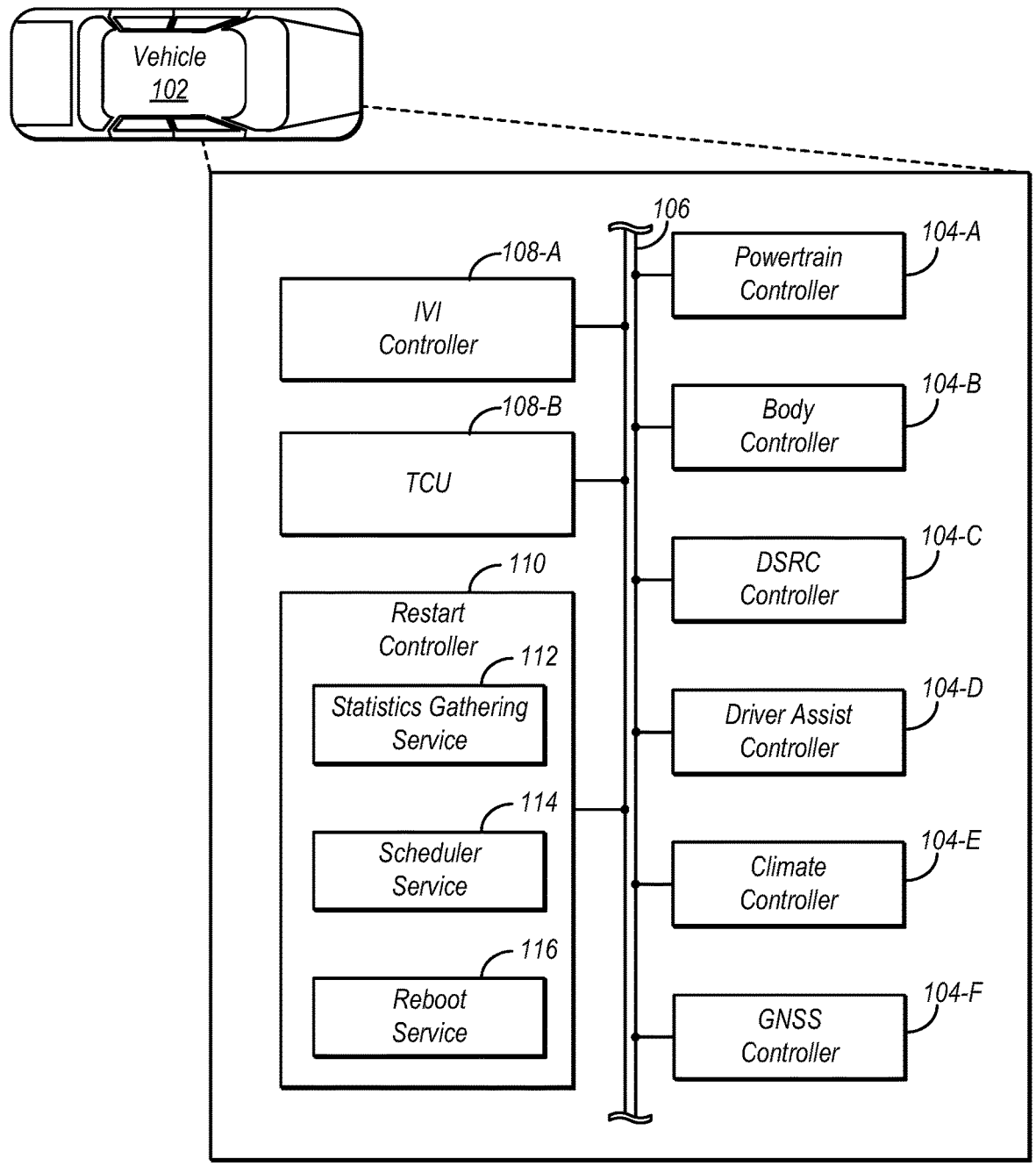
FIG. 1 illustrates an example system for the opportunistic scheduling and performance of vehicle controller restart to reduce end-user impact.

FIG. 1 illustrates an example system 100 for the opportunistic scheduling and performance of a vehicle 102 controller restart to reduce end-user impact. As illustrated, the vehicle 102 include a plurality of vehicle electronic control units (ECUs) or controllers 104, 108 in communication over one or more vehicle buses 106. The controllers 104 may be microcontrollers that can boot in milliseconds or a few seconds. The controllers 108 may be high-function ECUs that require orders of magnitude more time than the controllers 104 to reboot. A restart controller 110 may further be in communication with the controllers 104, 108 over the vehicle buses 106 and may be configured to perform the scheduling of reboots of the controllers 108. To do so, the restart controller 110 may utilize a statistics gathering service 112, a scheduler service 114, and a reboot service 116. It should be noted that the system 100 is only one example, and systems 100 having more, fewer, or different components may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery-electric vehicle (BEV) powered one or more electric motors, a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104, 108 configured to perform and manage various vehicle 102 functions under the power of the vehicle battery and/or drivetrain. The controllers 104, 108 may each include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, the processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc. As depicted, the example vehicle controllers 104, 108 are represented as discrete controllers. However, the vehicle controllers 104, 108 may share physical hardware, firmware, and/or software, such that the functionality of multiple controllers 104, 108 may be integrated into a single controller 108, and that the functionality of various such controllers 104, 108 may be distributed across a plurality of controllers 104, 108.

The vehicle bus 106 may include various methods of communication available between the vehicle controllers 104, 108. As some non-limiting examples, the vehicle bus 106 may include one or more of a vehicle controller area network (CAN), an Ethernet network, or a media-oriented system transfer (MOST) network.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a dedicated short-range communication (DSRC) transceiver controller 104-C may be configured to communicate with key fobs, mobile devices, or other local vehicle 102 devices; a driver assist controller 104-D may be configured to monitor and control the autonomous driving features of the vehicle 102, such as lane keeping assistance, adaptive cruise control, autobraking, or the like; a climate control management controller 104-E may be configured to provide control of heating and cooling system components (e.g., compressor clutch, blower fan, temperature sensors, etc.); and a global navigation satellite system (GNSS) controller 104-F may be configured to provide vehicle location information.

As an example of a high-function controller 108, an IVI controller 108-A may be configured to support voice command and BLUETOOTH interfaces with the driver and driver carry-on mobile devices as well as to play content from radio stations or other sources of media content. As another example of a high-function controller 108, a TCU 108-B may include network hardware configured to facilitate communication between the vehicle controllers 104,108 and with other devices of the system 100. For example, the TCU 108-B may include or otherwise access a cellular modem configured to facilitate communication with a wide-area network. The wide-area network may include one or more interconnected communication networks such as the Internet, a cable television distribution network, a satellite link network, a local area network, and a telephone network, as some non-limiting examples.

Similar to the controllers 104, 108, the restart controller 110 may include various types of computing apparatus including a memory on which computer-executable instructions may be maintained, where the instructions may be executable by one or more processors (not shown for clarity). Such instructions and other data may be stored using a variety of computer-readable media. In a non-limiting example, the restart controller 110 may be configured to maintain instructions and data for the statistics gathering service 112, scheduler service 114, and reboot service 116.

The statistics gathering service 112 may be an example of a software application installed to the memory (not shown) of the restart controller 110. When executed by one or more processors (not shown) of the restart controller 110, the statistics gathering service 112 may be configured to track an accumulation of statistics related to historical vehicle 102 use patterns. In an example, the statistics gathering service 112 may perform a tally of local time intervals when the vehicle 102 is parked and ignition is off. Time information may be identified using a clock on the restart controller 110 or via monitoring for time information provided over the vehicle bus 106. In another example, based on the tally of local time intervals, the statistics gathering service 112 may identify top locations where the vehicle 102 is most likely parked and ignition is off. In an example, the top locations may be defined as a geofence based on data received from the GNSS controller 104-F or cellular information or wireless local area network (WLAN) service set identifier (SSID) information based on connection of the TCU 108-B to a network. The statistics gathering service 112 may also maintain a last scheduled reboot timestamp for each of the controllers 108.

The scheduler service 114 may be another example of a software application installed to the memory (not shown) of the restart controller 110. When executed by one or more processors (not shown) of the restart controller 110, the scheduler service 114 may be configured to programmatically mandate the scheduling of a next recurring reboot as a normal part of the controller 108 life-cycle. The next reboot time may be based on statistics gathered to guess the best time to reboot. A minimum set of data for performing the analysis may include data for at least a minimum period of time (e.g., 24 hours in one example). If availability of a minimum set of data is not met, then the scheduler service 114 may default to a minimum time of reboot interval (such as every 24 hours). The scheduler service 114 may also mandate a maximum reboot per day limit. The scheduler service 114 may ensure also that the controllers 108 are not unnecessarily rebooting multiple times a day by checking the last scheduled reboot timestamp maintained by the statistics gathering service 112. The scheduler service 114 may additionally persist a next suggested time of reboot of each of the controllers 108 in storage.

It should be noted, however, in certain exceptional cases, a controller 108 may be rebooted earlier than the suggested time of reboot deadline. For instance, there may be stability or performance reasons for initiating a reboot (e.g., a controller 108 running out of memory, apps behaving oddly, rapid power drain beyond what is expected, etc.). To make the determination, a watermark or minimum threshold level of memory or power drain before the issue raises to the level of reboot may be defined. Or, a fault occurring at a controller 108 may be a reason to enforce a reboot. A counter may be used to ensure that a forced reboot has not been accomplished for at least a minimum amount of time, to avoid reboot cycles where a controller 108 is being rebooted every key cycle. Still other factors may affect the determination of reboot. For instance, if there is a pending software update, then there may be no reason to perform a reset as the software update will trigger one anyway.

The reboot service 116 may be yet another example of a software application installed to the memory (not shown) of the restart controller 110. When executed by one or more processors (not shown) of the restart controller 110, the reboot service 116 may, on every transition where vehicle 102 ignition is off, and a controller 108 is entering a power saving suspended state, check the persisted suggested time of reboot against current local time and also the last reboot timestamp. If the deadline is reached or surpassed compared against current local time, and one or more top location-based conditions are met, then the reboot service 116 may proceed with reboot. If the deadline is reached or surpassed compared against current local time, but vehicle 102 is not at any of the top location criteria, then the reboot service 116 may allow skipping the reboot until next ignition cycle up. If the deadline is not reached, the reboot service 116 may avoid the performance of the reboot. In some examples, the reboot service 116 may also track a maximum allowance of skipped reboot periods.

The reboot service 116 may enforce additional conditions for the reboot, such as that ignition is off (or otherwise the vehicle 102 is not in a motive mode), the vehicle 102 is parked, and/or that an emergency call is not active or any high priority application is executing such as a diesel regen cycle. As another example, the reboot service 116 may defer reboot until a cloud connection of the vehicle 102 has been released (e.g., 30 minutes after ignition off/exiting motive mode). This may be done because, on average, 60% of remote requests (e.g., to lock car doors, etc.) arrive in the first 30 minutes. As yet another example, the reboot service 116 may verify that the main vehicle 102 battery has capacity to handle a reset (including environmental factors). For instance, the reboot service 116 may, utilizing the state of charge of the battery, calculate the hit of a reset taking into account battery health, ambient temperature, and potentially other factors relevant to the power usage.

Figure 2:
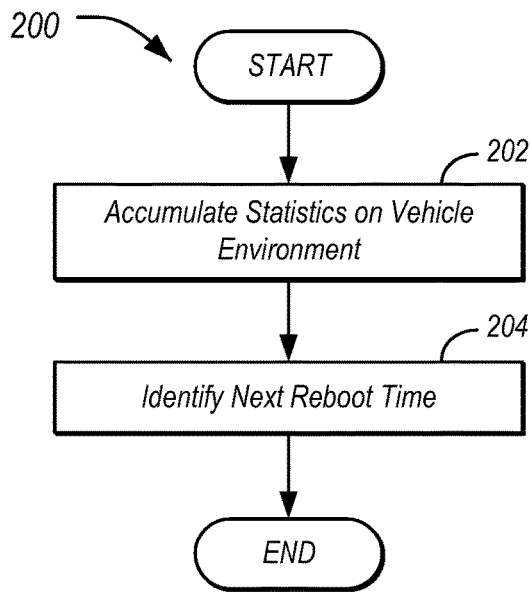
FIG. 2 illustrates an example process for the scheduling of vehicle controller restarts.

FIG. 2 illustrates an example process 200 for the scheduling of vehicle 102 controller restarts. In an example, the process 200 may be performed by the restart controller 110 in the context of the system 100.

At operation 202, the restart controller 110 accumulates statistics on the environment of the vehicle 102. In an example, the restart controller 110 may access the vehicle bus 106 to receive GNSS information from the GNSS controller 104-F and vehicle 102 speed or gear information from the powertrain controller 104-A. The restart controller 110 may utilize the information to build up statistics of activity patterns for the vehicle 102. For instance, the statistics may indicate for each hour or minute increment of the day a likelihood that the vehicle 102 will be in use. Or, the statistics may indicate locations of the vehicle 102 by time, which may be used to determine how often the vehicle 102 remains parked at various locations.

The restart controller 110 identifies a next reboot time at 204. In an example, the restart controller 110 utilizes the statistics to determine a suggested time for the next reboot. For instance, if the captured statistics indicate that the vehicle 102 tends to remain in an uninterrupted park state at a particular location, then the next reboot time may be identified as a time that the vehicle 102 is expected to be parked at that particular location. Or, if the captured statistics indicate that the vehicle 102 tends to remain in an uninterrupted park state at a particular time, then that time may be identified directly as a time to perform the next reboot. In addition, the restart controller 110 may ensure that the next reboot time may be no sooner than a predefined amount of time from a last reboot (e.g., 24 hours), nor too far in the future from the last reboot time (e.g., 48 hours). After operation 204, the process 200 ends.

Figure 3:
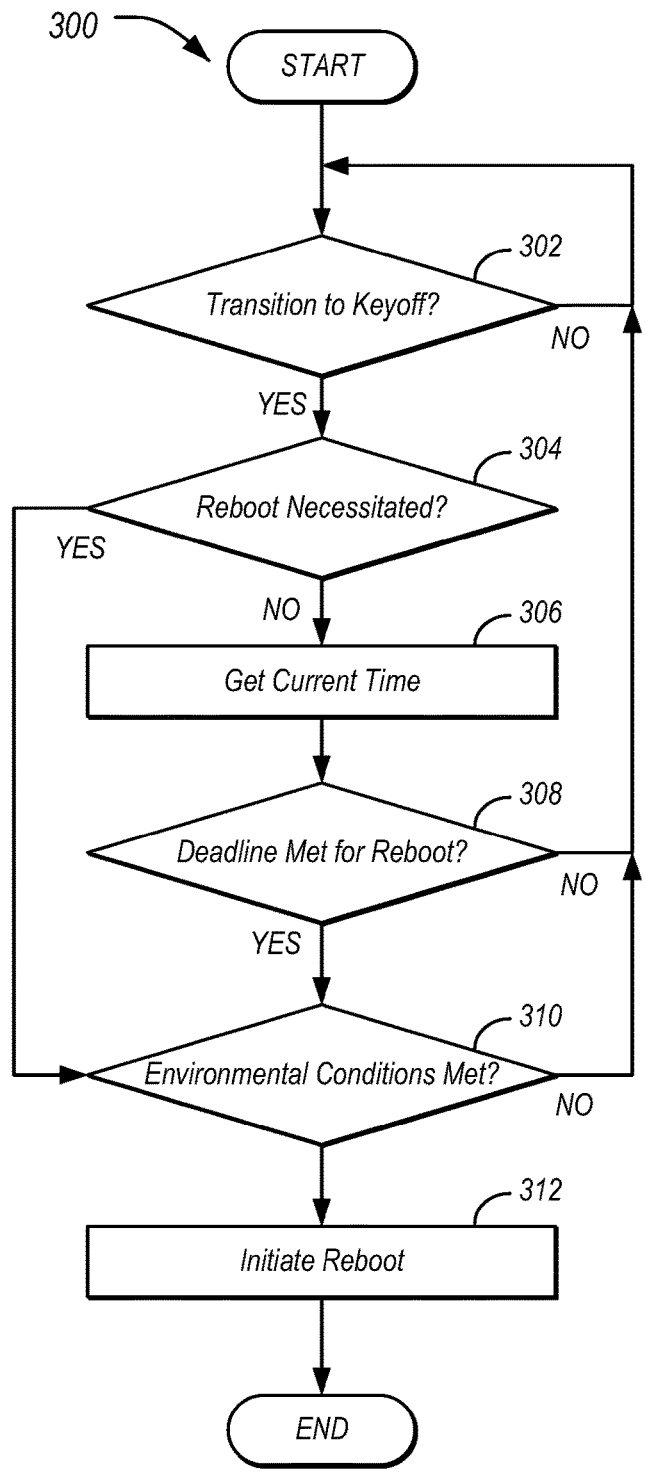
FIG. 3 illustrates an example process for the performance of a scheduled vehicle controller restart.

FIG. 3 illustrates an example process 300 for the performance of a scheduled vehicle 102 controller restart. As with the process 200, the process 300 may be performed by the restart controller 110 in the context of the system 100.

At 302, the restart controller 110 determines whether a transition to keyoff occurred. In an example, the restart controller 110 may receive information over the vehicle buses 106 from the the powertrain controller 104-A or body controller 104-B or another controller indicating that the vehicle 102 has transitioned to keyoff. If such an indication is received, control passes to operation 208. Otherwise control returns to operation 202.

At operation 304, the restart controller 110 determines whether a reboot is necessitated by factors independent of the next deadline for reboot. In an example, the restart controller 110 may determine whether a fault has occurred with a controller 108, or whether stability or performance issues are suggested by high memory use, high processor use, high power drain or some other unusual measure as compared to baseline or average for that measure. If so, control passes to operation 310. If not, control continues to operation 306.

The restart controller 110 retrieves the current time at 306. The current time may be retrieved from data traversing the vehicle buses 106, in an example. At operation 308, the restart controller 110 determines whether a deadline is met for reboot. In an example, the restart controller 110 compares the current time to the next reboot time maintained by the controller 110 and set using the process 200. If the current time is more recent than the next reboot time, control passes to operation 310. Otherwise, control returns to operation 302.

At 310, the restart controller 110 determines whether environmental conditions allow the reboot to occur. For instance, the restart controller 110 may confirm that the vehicle 102 has remained at keyoff. As another example, in cases where the scheduled reboot was done based on intention for the vehicle 102 to be at a predefined location, the restart controller 110 may confirm that the vehicle 102 is, in fact, at the intended location or at another top location where the vehicle 102 tends to remain unused for adequate time for a reboot. If environmental conditions allow for the reboot to occur, control transitions to operation 312. Otherwise, the process 300 returns to operation 302.

At operation 312, the restart controller 110 initiates the reboot. Accordingly, the high-function controllers 108 are restarted at a time and location that is intended to reduce negative user-impact, while also rebooting the high-function controllers 108 with frequency to ensure that the controllers 108 remain operating in working and updated state. Responsive to performance of the reboot, the restart controller 110 may update the last reboot time for the high-function controllers 108 to the time of the reboot. After operation 312, the process 300 ends.

Thus, the described opportunistic scheduling of vehicle controller restart to reduces end-user impact by avoiding common issues with existing reboot scheduling. More specifically, the described approach avoids issues where controllers 108 do not reboot at all, leaving the controllers 108 in an error state indefinitely. Additionally, issues are avoided caused by immediate reboots, which may cause negative end-user impact. Yet further, the described approach avoids issues with reboot only on ignition state changes, which results in multiple unnecessary reboots per day, also causing negative end-user impact.

Computing devices described herein generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
 a memory configured to store statistics indicative of historical vehicle use patterns; and
 a processor programmed to
 identify a next reboot time and top locations at which reboot is allowed according to the statistics, the top locations being locations where the vehicle is most often parked relative to other locations at which the vehicle is parked, and
 upon transition to a keyoff state, reboot a vehicle controller responsive to confirmation that a current time has reached at least the next reboot time and that the vehicle is located at one of the top locations,
 wherein the vehicle controller is a telematics controller or an in-vehicle infotainment system controller.

2. The vehicle of claim 1, wherein the processor is further programmed to, upon the transition to the keyoff state, reboot the vehicle controller responsive to confirmation that the current time is at least a predefined threshold time after a last reboot of the vehicle controller, regardless of whether the vehicle is located at one of the top locations.

3. The vehicle of claim 1, wherein the processor is further programmed to reboot the vehicle controller upon transition to the keyoff state regardless of the next reboot time, responsive to one or more of: detection of a fault at the vehicle controller, memory usage at the vehicle controller in excess of a threshold memory usage amount, processor usage at the vehicle controller in excess of a threshold processor usage amount, or power usage at the vehicle controller in excess of a threshold power usage amount.

4. The vehicle of claim 1, wherein the vehicle controller requires more than one minute to reboot.

5. The vehicle of claim 1, wherein the telematics controller is configured to provide a vehicle WiFi hotspot, and the processor is further programmed to defer the reboot of the vehicle controller while devices are connected to the vehicle WiFi hotspot.

6. The vehicle of claim 1, wherein the top locations include geofences surrounding locations where the vehicle is parked based on the historical vehicle use patterns.

7. The vehicle of claim 1, wherein the top locations are defined by one or more of cellular information; or wireless local area network (WLAN) service set identifier (SSID) information for network connections of the vehicle.

8. A method for rebooting controllers of a vehicle comprising:
   accumulating statistics from the vehicle, indicative of time intervals of days of the week when the vehicle is parked and top locations where the vehicle is most often parked, the top locations being locations where the vehicle is most often parked relative to other locations at which the vehicle is parked;
   setting a scheduled reboot deadline as a future day of the week and time based on the time intervals when the vehicle is parked;
   identifying a set of top locations where the vehicle is most often parked;
   responsive to vehicle keyoff, identifying whether the scheduled reboot deadline has been reached and whether the vehicle is located at one of the top locations, the controllers including a telematics controller or an in-vehicle infotainment system controller;
   responsive to both the reboot deadline being reached and the vehicle being located at a reboot location, or responsive to no reboot of the controllers having been performed for at least a maximum reboot time interval, rebooting the controllers; and
   otherwise, deferring rebooting of the controllers.

9. The method of claim 8, wherein the telematics controller is configured to provide a vehicle WiFi hotspot, and further comprising deferring the reboot of the telematics controller while devices are connected to the vehicle WiFi hotspot.

10. The method of claim 8, wherein the reboot location is defined as any location within a predefined geofence.

11. The method of claim 8, wherein the set of top locations is defined according to one or more of: cellular information; or wireless local area network (WLAN) service set identifier (SSID) information for network connections of the vehicle.

12. A non-transitory computer-readable medium comprising instructions that, when executed by a processor of a vehicle, cause the vehicle to:
   accumulate statistics from the vehicle, indicative of time intervals of days of the week when the vehicle is parked and top locations where the vehicle is most often parked, the top locations being locations where the vehicle is most often parked relative to other locations at which the vehicle is parked;
   set a scheduled reboot deadline for a subset of vehicle controllers as a future day of the week and time based on the time intervals when the vehicle is parked, the subset of the vehicle controllers including a telematics controller or an in-vehicle infotainment system controller;
   identify a set of top locations where the vehicle is most often parked;
   responsive to vehicle keyoff, identify whether the scheduled reboot deadline has been reached and whether the vehicle is located at one of the top locations;
   responsive to both the reboot deadline being reached and the vehicle being located at a reboot location, or responsive to no reboot of the controllers having been performed for at least a maximum reboot time interval, reboot the controllers; and
   otherwise, defer reboot of the subset of vehicle controllers.

13. The medium of claim 12, wherein the subset of the vehicle controllers includes a telematics controller configured to provide a vehicle WiFi hotspot, the medium further comprising instructions that, when executed by the processor of the vehicle, cause the vehicle to defer the reboot of the subset of vehicle controllers while devices are connected to the vehicle WiFi hotspot.

14. The medium of claim 12, wherein the set of top locations is defined by one or more geofences or by cellular information and/or wireless local area network (WLAN) service set identifier (SSID) information for network connections of the vehicle.

* * * * *